Aug. 26, 1941.  J. T. DUFFY, JR  2,253,770
METHOD OF CONTINUOUSLY MANUFACTURING BREAD
Filed April 5, 1940  7 Sheets-Sheet 1

Aug. 26, 1941.   J. T. DUFFY, JR   2,253,770
METHOD OF CONTINUOUSLY MANUFACTURING BREAD
Filed April 5, 1940   7 Sheets-Sheet 3

Inventor
J. T. DUFFY, JR.

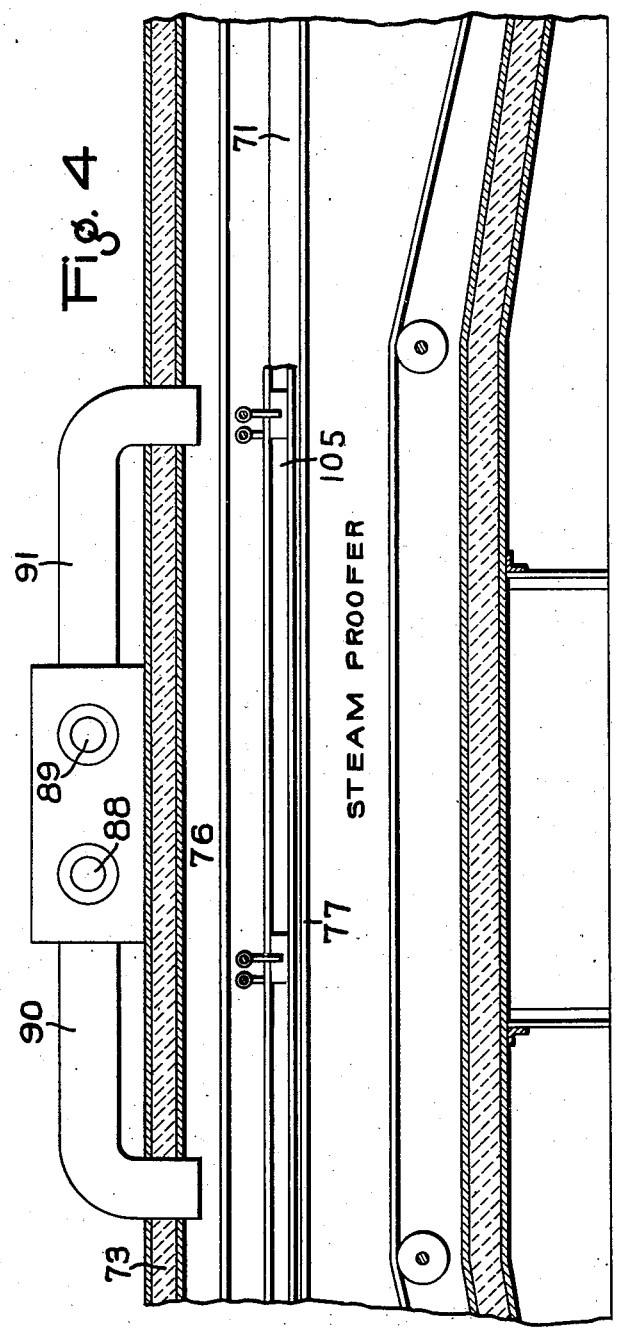

Aug. 26, 1941.  J. T. DUFFY, JR  2,253,770
METHOD OF CONTINUOUSLY MANUFACTURING BREAD
Filed April 5, 1940  7 Sheets-Sheet 5

Inventor
J. T. DUFFY, JR.
By
Attorney

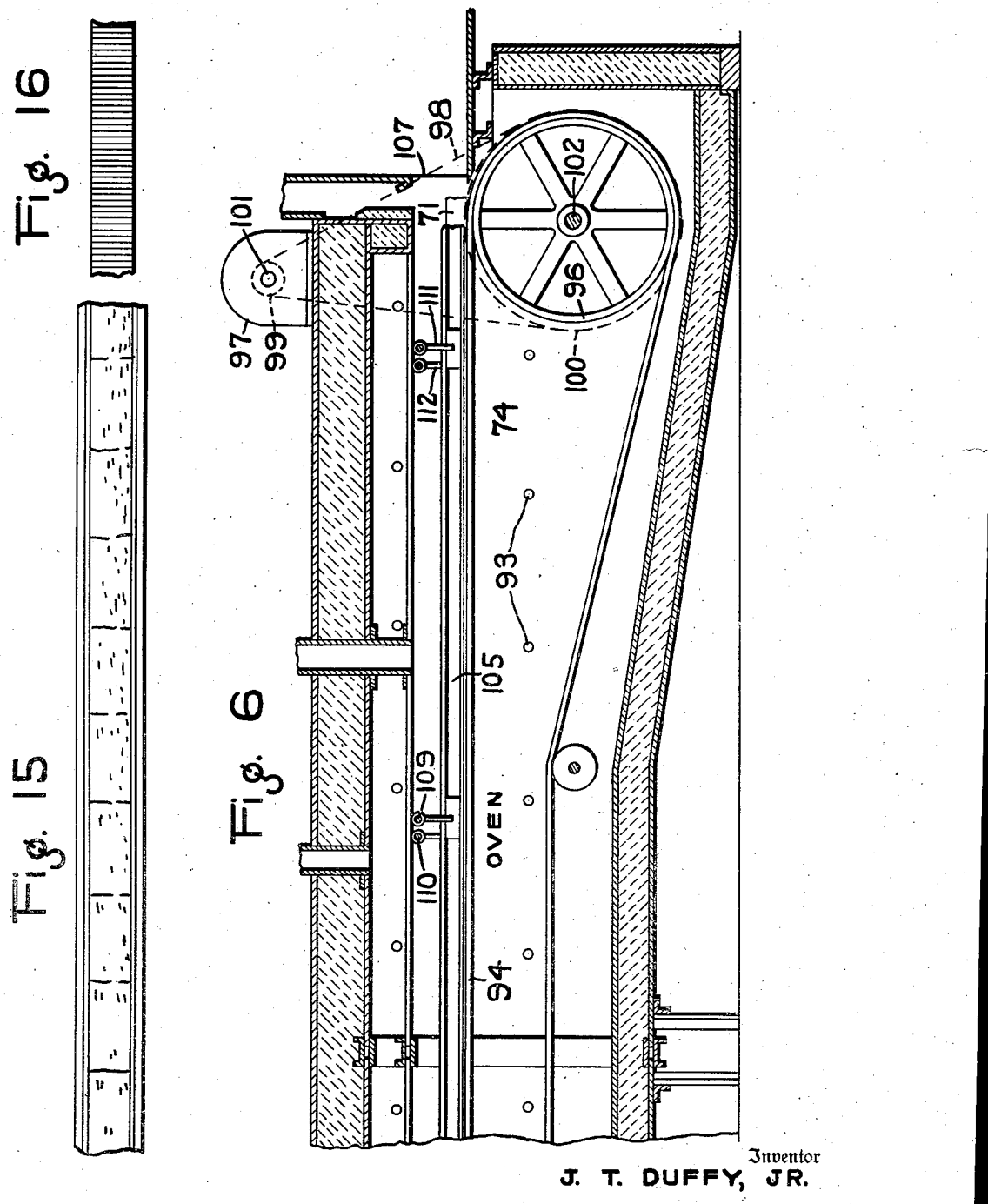

Aug. 26, 1941.  J. T. DUFFY, JR  2,253,770.
METHOD OF CONTINUOUSLY MANUFACTURING BREAD
Filed April 5, 1940  7 Sheets—Sheet 7
Fig. 8
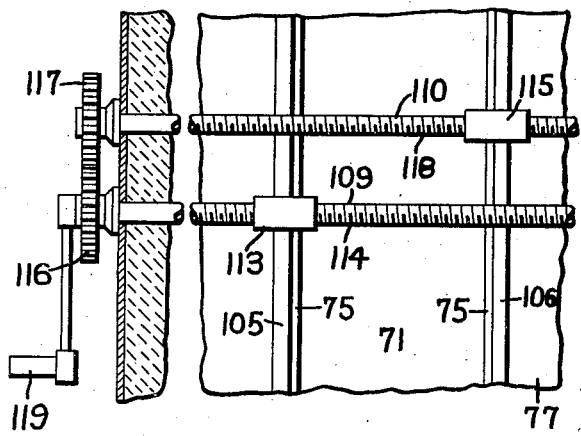
Fig. 7
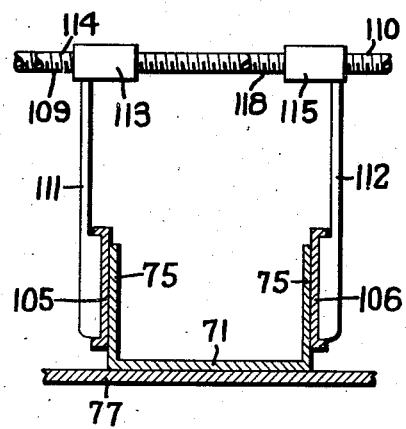
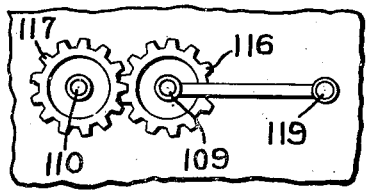
Fig. 9
Fig. 10
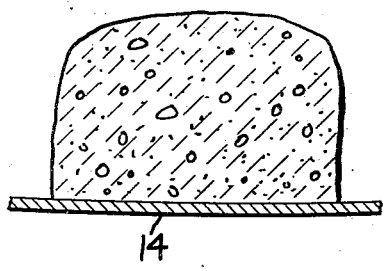
Fig. 11
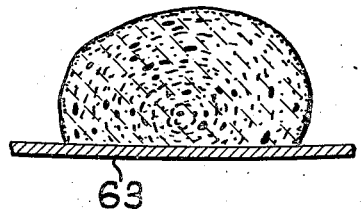
Inventor
J. T. DUFFY, JR.
By Malcolm F. Gannett Attorney Patented Aug. 26, 1941

2,253,770

UNITED STATES PATENT OFFICE 2,253,770

METHOD OF CONTINUOUSLY MANUFACTURING BREAD

James T. Duffy, Jr., York, Pa., assignor to Read Machinery Co., Inc., York, Pa., a corporation of Pennsylvania Application April 5, 1940, Serial No. 327,937

2 Claims. (Cl. 107—54)

This invention relates to a method of continuous manufacture of bread and is a continuation in part of the invention described in application filed in the United States Patent Office in the names of James T. Duffy, Jr., and Paul Jackson, September 16, 1939, Serial No. 295,203.

An object of the present invention is to provide an improved method for the continuous manufacture of bread in the form of a strip.

Another object of the present invention is to provide an improved method for the continuous manufacture of bread in the form of a strip, in which the dough is handled by automatic machinery from the mixer, through several stages to the oven, and baked.

Another object of the invention is to provide an improved continuous strip bread making method in which the dough is worked so as to improve the texture of the baked bread over bread produced heretofore by known methods.

Other objects, features, and advantages of the present invention will be apparent from the detailed description to follow, taken with the accompanying drawings, in which Figs. 1 to 6 inclusive are diagrammatic views, partly in section and partly in elevation, of a continuous bread manufacturing plant embodying the present invention;

Fig. 7 is a vertical transverse section taken on the line 7—7 of Fig. 2;

Fig. 8 is a plan of the structure shown in Fig. 7 showing the operating mechanism for the adjustable side guides;

Fig. 9 is a side elevation of the operating mechanism shown in Fig. 8;

Fig. 10 is a vertical transverse section taken on the line 10—10 of Fig. 3;

Fig. 11 is a vertical transverse section taken on the line 11—11 of Fig. 3;

Figure 1:
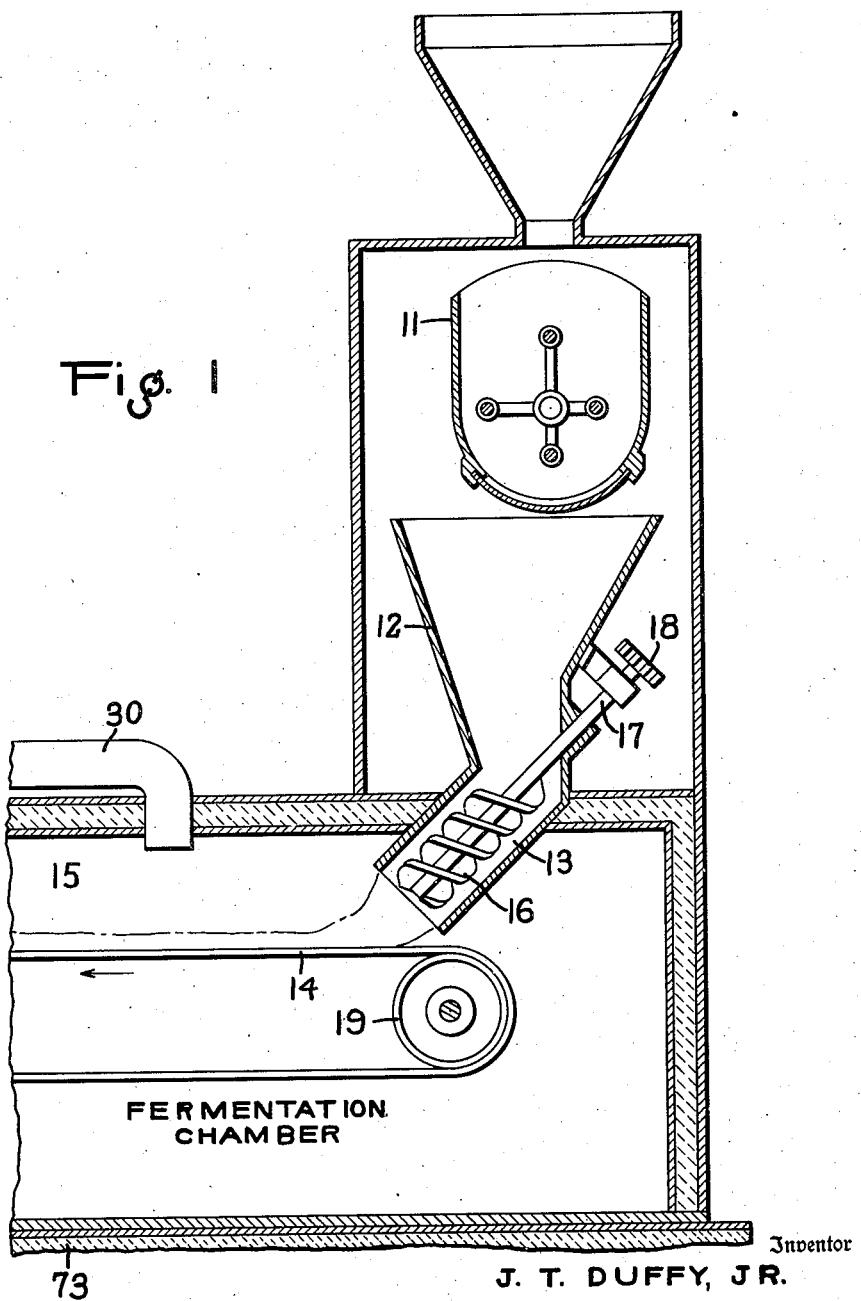

Figs. 12 to 15 inclusive are plan views of dough supporting means located in the steam proofer and the oven, respectively, showing the manner in which the bread is formed thereon; and Fig. 16 is a detail plan view of a portion of the strip of baked bread showing the manner in which the same is formed into slices.

According to the present invention, a batch of unfermented bread dough, prepared in the usual manner by a mixer 11, is discharged from the mixer into the hopper 12 of an extruding machine 13.

The extruding machine 13 is adapted to feed the dough in a continuous strip on to the belt 14 of a conveyor located in a fermentation chamber 15, and for this purpose the extruding machine may be constructed with a tubular casing having a spiral conveyor or feeding worm 16 therein mounted on a shaft 17 which extends through one end of the housing of said extruding machine and is operated by any suitable mechanism, such as the gear 18. The gear 18 may be operatively connected in any desired manner to a suitable source of power adapted to impart rotation to the shaft 17 at the desired rate of speed.

As shown in Fig. 1 the spiral conveyor or worm 16 of the extruding machine 13 may be disposed at a vertical angle with respect to the conveyor belt 14. Also the mouth of the tubular casing of the extruding machine 13 which houses the spiral conveyor or worm 16 is unrestricted, so that the strip of dough fed on to the conveyor belt 14 by the extruding machine will not have a tendency to accumulate at the discharge end of the extruding machine but will move readily along with the conveyor.

Figure 2:
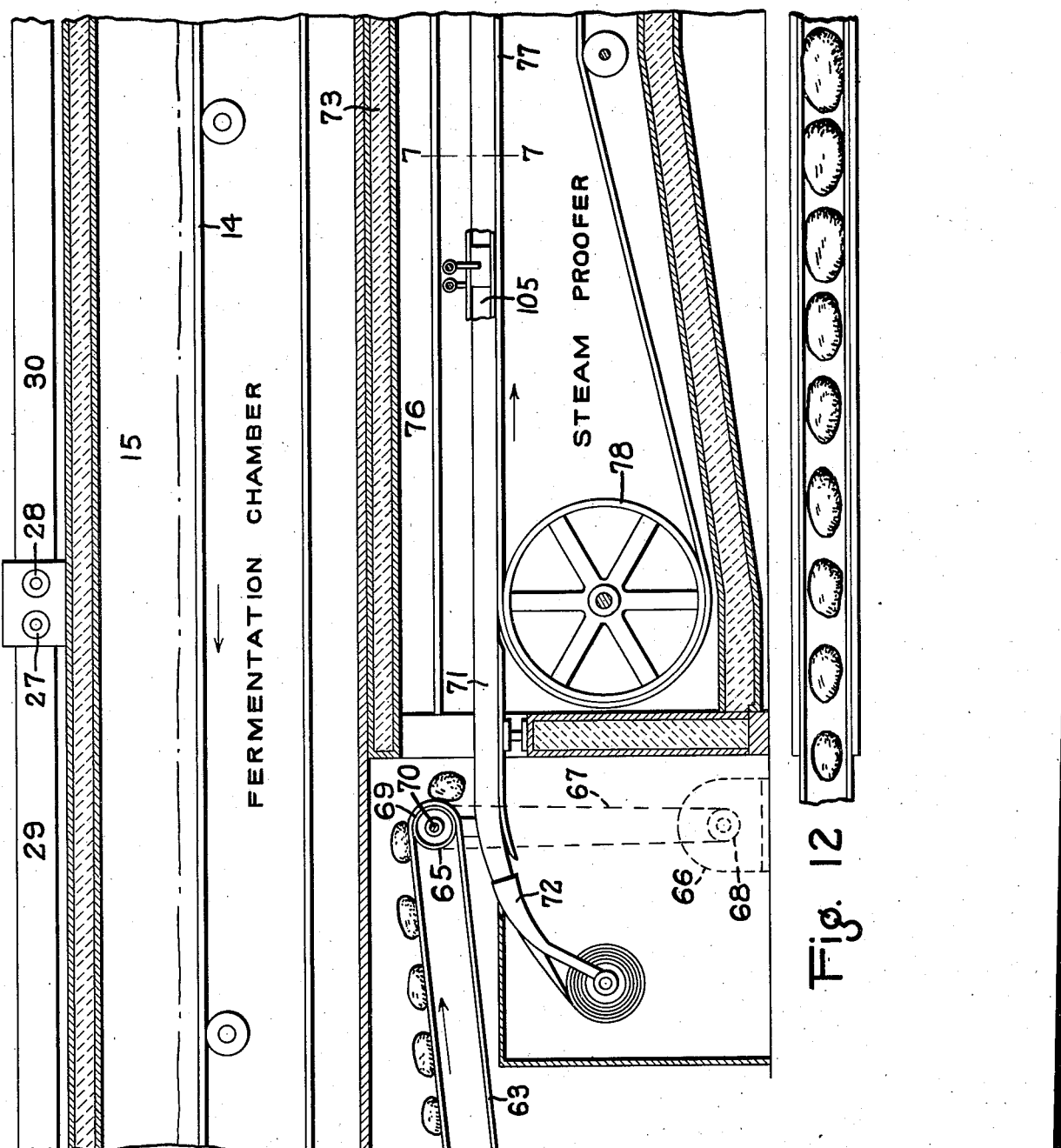
Figure 3:
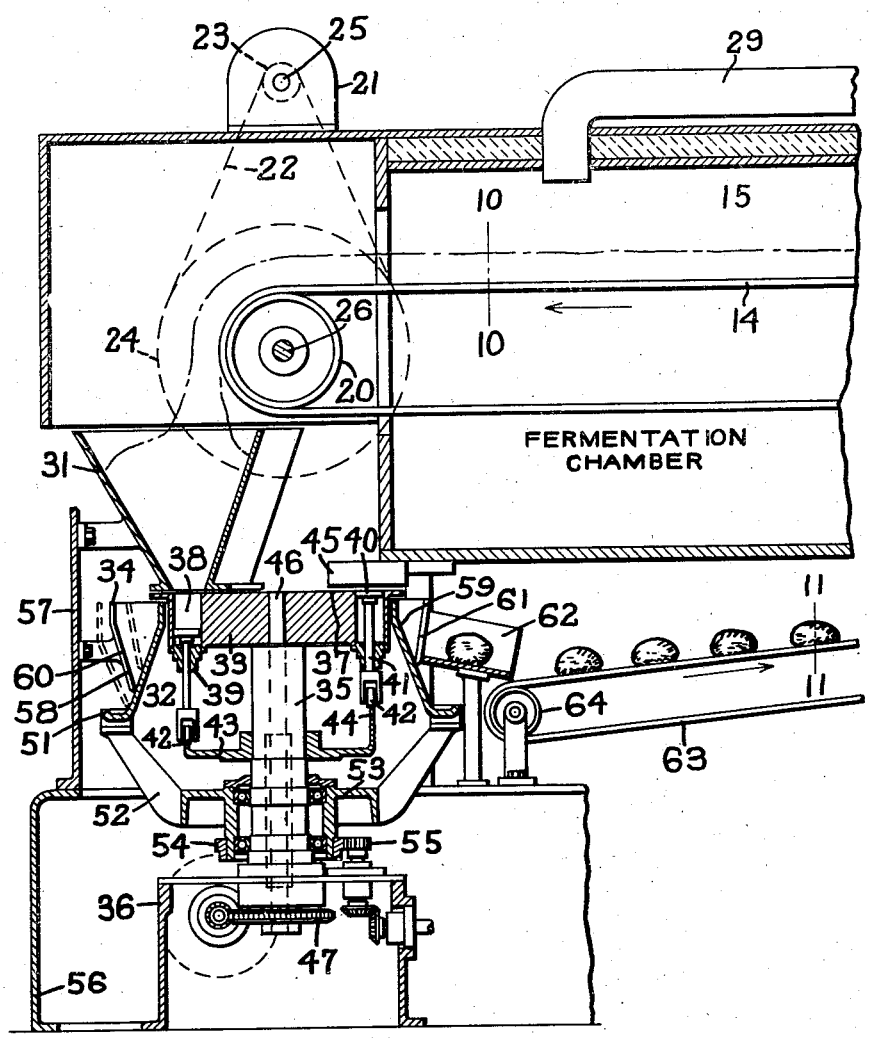

The fermentation chamber 15 is shown in Figs. 1, 2 and 3. This chamber and the conveyor belt 14 therein both have a length sufficient to permit the dough to ferment in the desired manner while the strip of dough is moving from one end of the chamber 15 to the other.

The purpose of the extruding machine 13 is to form the dough in a continuous strip of uniform cross section, the strip of dough thus formed being discharged on to the conveyor belt 14.

The belt 14 may be in the nature of an endless conveyor supported at each end by suitable pulleys on wheels 19 and 20, the wheel 20 being operatively connected to an electric motor 21 (Fig. 3), or other suitable source of power, by means of a belt or chain 22 mounted, respectively, on pulleys or sprockets 23 and 24 fixed to the motor shaft 25 and to the pulley or wheel shaft 26. The motor 21 is adapted to operate the belt 14 in the direction of the arrows, Figs. 1, 2 and 3, at the desired speed. Preferably the belt 14 travels at a speed slightly faster than the speed at which the dough is discharged from the extruding machine 13, so that the strip of dough is pulled or stretched slightly after the dough is discharged from the extruding machine.

The fermentation chamber 15 is in the nature of a housing which is constructed of suitable material so as to enclose the conveyor belt. This housing may be built around the discharge end of the extruding machine 13, as shown in Fig. 1.

In order that the atmosphere within the chamber 15 can be controlled, suitable humidity and temperature controls 27 and 28, respectively, are provided (see Fig. 2). These controls may be operatively connected with the chamber 15 by means of ducts or pipes 29 and 30, as shown in Figs. 1, 2 and 3.

At the discharge end of the fermentation chamber 15 there is a hopper 31 for receiving the fermented dough.

From the hopper 31 the dough is fed to a forming mechanism 32 adapted to size and shape the dough preparatory to final proofing and baking.

As shown in Fig. 3, the forming mechanism 32 may comprise a divider 33 for forming the dough into lumps, and a baller or rounder 34 for imparting the usual kneading operation to the lumps of dough.

The divider 33 may comprise a tubular standard 35 fixed on a suitable support or base 36.

Revolvably mounted on the standard 35 is a horizontal circular table 37 formed with a series of vertical cylinders 38.

The cylinders 38 are located adjacent to the periphery of the table 37 and each cylinder is open at the top so as to register with the open contracted bottom of the hopper 31 during operation of the divider.

The bottom of each cylinder is closed by a head 39.

A piston 40 is reciprocably mounted in each cylinder.

A rod 41 extends downwardly from the piston through the head 39.

The lower end of the rod 41 has a roller 42 mounted thereon, said roller running on a cam track 43.

The contour of the cam track 43 is such that when a cylinder 38 is disposed beneath the bottom of the hopper 31 the piston 40 will be disposed in its lowermost position in the cylinder, thereby forming a cavity of the desired size, said cavity constituting a dough-measuring chamber.

After the cylinder moves away from the bottom of the hopper 31, the piston 40 is moved upwardly in the cylinder 38 by reason of the elevated portion 44 of the cam track. At one period in the rotation of the table 37 the piston 40 will be substantially flush with the top of the cylinder 38 so that the dough which was in the chamber will be ejected therefrom and rest on the face of the table 37.

The revolving action of the table 37 carries the lumps of dough against a stripper 45 which directs the dough towards the rounder 34.

Fixed to the table 37 and rotatably mounted within the tubular standard 35, is a shaft 46 which has mounted on its lower end a gear 47, driven from a suitable source of power supply in any convenient manner.

The rounder 34 comprises a rotatable kneading wheel 51, the upper portion of which may surround the divider table 37, as shown in Fig. 3.

Webs or spokes 52 connect the lower portion of the wheel 51 with a hub 53 rotatably mounted on the standard 35.

Fixed to the hub 53 is a ring gear 54, the teeth of which are in meshing relationship with a pinion 55, driven from a suitable source of power supply in any convenient manner.

Surrounding the base 36 is a second base 56 which constitutes a support for a frame 57 mounted thereon.

Secured to the frame and arranged in well known manner in the form of a spiral around the rotatable kneading wheel 51, is a kneading ring 58.

The kneading wheel 51 has an outwardly inclined outer surface 59 and the kneading ring 58 has an inwardly inclined surface 60 so disposed with respect to the inclined surface 59 of the kneading wheel as to afford a constant rolling and kneading on the balls of dough.

At a suitable point the kneading ring 58 is formed with an opening 61 and associated with said opening is a discharge chute 62 adapted to direct the balls of dough on to a conveyor 63.

In the course of their travel through the rounder 34, the rolling and pressure is effected uniformly to all parts of the lumps of dough and the desired skin is developed on the outer surface thereof.

The conveyor 63 may be in the nature of an endless belt conveyor supported at each end by suitable pulleys or wheels 64 and 65, the wheel 65 being operatively connected to an electric motor or other driving means 66, by means of a belt or chain 67 mounted, respectively, on pulleys or sprockets 68 and 69 fixed to the shaft of said motor and to the pulley or wheel shaft 70, as shown in Fig. 2.

The lumps of dough are discharged from the conveyor 63 on to supporting means 71, which supports the dough while it travels through the final steam proofer 73 and oven 74.

Any suitable material may be employed for the dough supporting means 71. In actual practice, wax paper has proven good for this purpose, since the dough will not adhere thereto. The wax paper can be delivered from a roll having scores lengthwise of the paper. The paper after leaving the roll, passes through suitable means, indicated at 72, Fig. 2, which means are adapted to bend or fold the wax paper lengthwise, so as to form the supporting means 71 with vertical side walls 75, as shown in Fig. 8. In this way the supporting means is substantially U-shaped or of channel form in cross section so that the dough will be supported on the bottom and both sides. On the other hand, if it is desired to produce what is known as "Pullman" slices of bread by the improved process of this invention, then in lieu of the U-shaped paper strip supporting means 71, a tubular paper member may be employed, such tubular member being rectangular in cross section. Or any other suitable element may be used for supporting the dough during the proofing and baking steps, in order to impart to the baked products the desired shape and size.

Figure 5:
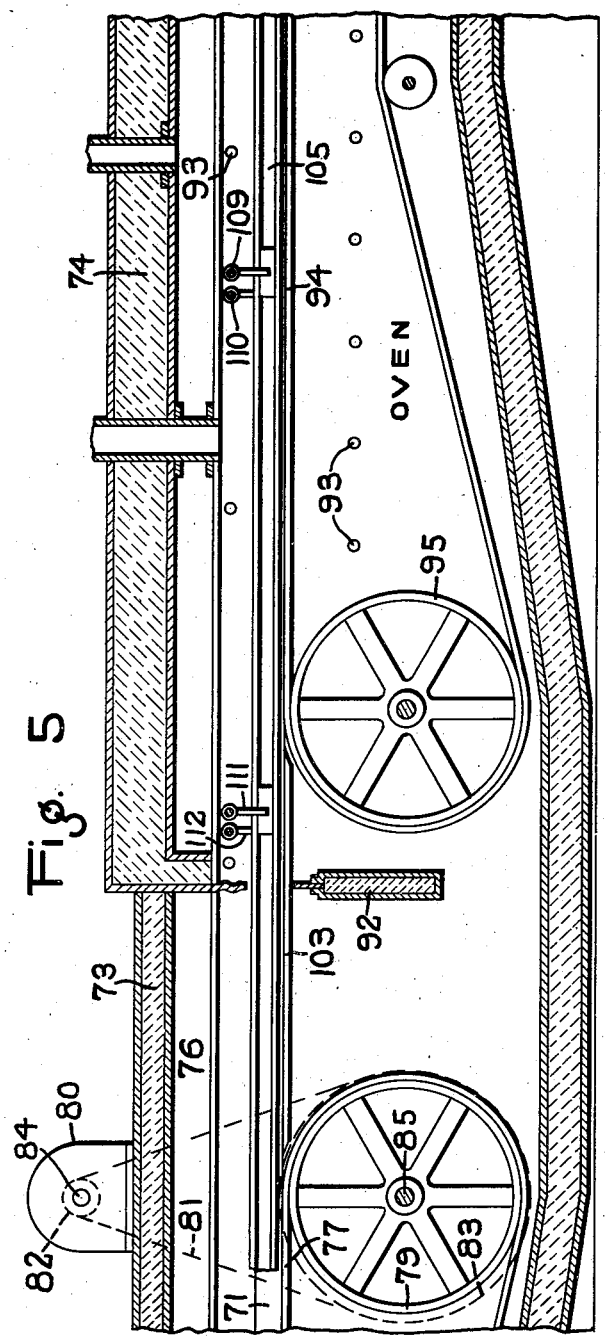

As shown in Figs. 2, 4 and 5, the steam proofer 73 comprises an elongated structure having insulated walls, top and bottom to provide a chamber 76 in which is mounted a conveyor 77 which carries the dough on the supporting means 71 through the steam proofer.

The conveyor 77 may be in the form of an endless belt conveyor supported at each end by suitable pulleys or wheels 78 and 79, the wheel 79 being operatively connected to an electric motor 80, or other driving means, by means of a belt or chain 81 mounted, respectively, on pulleys or sprockets 82 and 83 fixed to the motor shaft 84 and the shaft 85 of the wheel 79, respectively, as shown in Fig. 5.

The conveyor 77 is entirely enclosed by the walls of the steam proofer 73, the end of the conveyor having the wheel 78 being located adjacent to the discharge end of the conveyor 63 and the end of the conveyor having the wheel 79 being located adjacent to the end of the steam proofer 73 which is connected to one end of the oven 74 (see Fig. 5).

In order that the atmosphere within the steam proofer 73 can be controlled, suitable humidity and temperature controls 88 and 89, respectively, are provided (see Fig. 4). These controls may be operatively connected with the chamber 76 by means of ducts or pipes 90 and 91.

The steam proofer 73 and the oven 74 are connected end to end, but since the temperature within the oven 74 is considerably higher than the temperature within the steam proofer, a dividing wall 92 is constructed, as shown in Fig. 5.

The oven 74 comprises an elongated structure having comparatively thick insulated walls, of well known construction.

Extending into the oven 74 are burners 93 or other means for controlling the amount of temperature within the oven.

Disposed within the oven 74 is a conveyor in the form of an endless belt 94 supported at each end by suitable pulleys or wheels 95 and 96, the wheel 96 being operatively connected to an electric motor 97, or other power driving means, by means of a belt or chain 98 mounted, respectively, on pulleys or sprockets 99 and 100, fixed to the motor shaft 101 and the shaft 102 of the wheel 96, respectively, as shown in Fig. 6.

The conveyor 94 is enclosed by the walls of the oven 74, the space between the end of the conveyor having the wheel 95 and the adjacent end of the steam proofer conveyor 77 being provided with a horizontally disposed plate 103 which is disposed in substantially the same plane as the upper horizontal portions of said conveyors so as to support the member 71 and the dough therein when said member moves from the steam proofer 73 into the oven 74.

For the purpose of supporting the side walls 75 of the dough supporting means 71, stationary side guides 105 and 106 are provided. These guides extend the full length of both the steam proofer 73 and the oven 74, from a point adjacent to the member 72 to the oven outlet or discharge opening 107.

The guides 105 and 106 are arranged in substantially parallel relationship, said guides being spaced apart a distance equal substantially to the width of the bread produced by the process and apparatus.

In order to provide means for adjusting the distance between the guides 105 and 106 so that the apparatus can be used for making bread of various widths, suitable adjusting mechanism is provided in the means for supporting the guides.

At intervals throughout the length of the steam proofer 73 and the oven 74, pairs of horizontal rods 109 and 110 are mounted in the side walls of the structure in spaced relation above the conveyors 77 and 94.

Depending from the rods 109 are hangers 111 and depending from the rods 110 are hangers 112.

The lower ends of the hangers 111 are connected to the guide 105, and the lower ends of the hangers 112 are connected to the guide 106.

The upper portion of the hanger 111 is formed with an internally threaded collar 113 which is mounted on a screw-threaded portion 114 of the rod 109.

The upper portion of the hanger 112 is formed with an internally threaded collar 115 which is mounted on a screw-threaded portion 116 of the rod 110.

In order to rotate the rods 109 and 110 so as to move the hanger 111 towards and away from the hanger 112, the extremities of the rods 109 and 110 which are disposed on the exterior of the structure, each have mounted thereon a gear 116 and 117, respectively, as shown in Figs. 8 and 9, said gears having their teeth in meshing relationship.

A crank 119 is fixed to the end of the rod 109.

Operation of the crank 119 will effect rotation of the rods 109 and 110 in the opposite directions, and since the collars are held by the guides from turning, the hangers 111 and 112 will be moved in opposite directions, thereby moving the guides 105 and 106 towards or away from each other depending upon the direction of rotation imparted to the crank 119.

From the foregoing it will be understood that I have provided an improved method of manufacturing bread continuously. Primarily, the method and apparatus is applicable to the manufacture of what is known as baker's bread, that is to say, the product which is composed of a plurality of slices of uniform thickness and approximately four to five inches in width and three and one-half to five inches in height, which bread is composed of a yeast dough containing flour, salt, sugar, shortening, milk or other liquid, etc.

As shown in Fig. 1, the upper portions of both Figs. 2 and 3, and in Fig. 10, the dough is carried in the form of an unconfined strip on the conveyor 14, at the desired rate of speed to permit the dough to ferment, through the fermentation chamber 15.

At the end of the fermentation chamber 15 farthest away from the mixer 11, the fermented dough is fed by gravity to the divider 33 and from thence to the rounder 34.

The purpose of the divider 33 is to reduce the mass of fermented dough into lumps of a size which can be accommodated in the rounder 34.

The purpose of the rounder 34 is to work or knead the dough and to develop a skin thereon as has been found desirable in the manufacture of bread. In working or kneading the dough, the movement of the lumps of dough through the rounder 34 imparts a spiral twisting action to each lump of dough, the center of the spiral being disposed generally near the center of each lump or ball of dough, as shown in Fig. 11. The action of the rounder 34 also flattens to some extent the pores produced in the dough by the action of the yeast during the fermentation period.

When the kneaded or worked lumps of dough are discharged from the rounder 34, they fall on to the conveyor 63 which is operated at such a speed as to quickly carry the balls of dough towards the steam proofer 73.

As the conveyor 63 carries the lumps of dough from the rounder 34 towards the steam proofer 73, the lumps gradually flatten out to some extent and may increase slightly in size by the time they enter the steam proofer.

Since the lumps of dough are discharged from the conveyor 63 on to a conveyor having upstanding side walls, as the dough moves slowly through the steam proofer 73 and the size of each lump increases, due to the action of the yeast, the lumps gradually become elongated, as shown in Figs. 12 and 13, so that by the time the end of the steam proofer 73 is reached, the lumps lose their identity and join end to end to form a continuous strip.

As is well known, it usually requires approximately thirty minutes in order to properly bake bread. Consequently the length of the oven 74 and the speed of travel of the conveyor 94 is such as to permit the strip of dough at any given point to remain in the oven for approximately thirty minutes.

Figure 14:
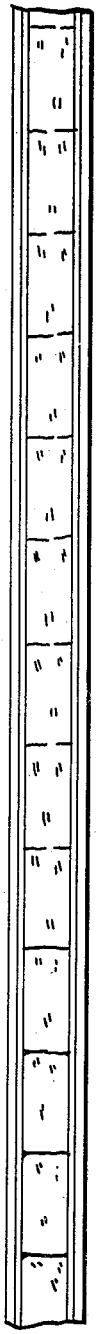

In Figs. 14 and 15 I have shown the strip of dough as the same appears in the oven during the baking period. The lines across the strip of dough denote merely the upper surface marks or creases such as are present in all bread, rolls, etc., formed of more than one lump.

In Fig. 16 I have illustrated the manner in which the baked strip of dough can be divided transversely in order to provide sliced bread. A number of these slices can be bunched together and wrapped in well known manner to provide a loaf of sliced bread. Since the slices are formed transversely of the baked strip of bread, each loaf will consist of uniform slices and there will not be any crusts at the ends of the loaf, such as the crusts formed on loaves of pan baked bread.

Having thus described my invention, what I claim is:

1. The method of continuous manufacture of bread in the form of a strip which comprises providing a supply of unfermented bread dough, continuously extruding the unfermented dough to form a strip, continuously moving the continuous strip of dough through a controlled atmosphere to cause progressive fermentation of the dough, dividing the strip of fermented dough into lumps of a predetermined size, moulding the individual lumps of dough into ball form with a skin thereover, continuously conveying the lumps of dough through a controlled proofing atmosphere at such a rate of speed that the lumps of dough increase in size to such an extent as to merge with one another to form a continuous strip, and then continuously moving the continuous strip through a baking atmosphere and progressively baking said strip without disturbing the continuity thereof.

2. The method of continuous manufacture of bread in the form of a strip which comprises providing a supply of unfermented bread dough, continuously extruding the unfermented dough to form a strip, continuously moving the continuous strip of dough through a controlled atmosphere to cause progressive fermentation of the dough, dividing the strip of fermented dough into lumps of a predetermined size, moulding the individual lumps of dough successively to develop the individual lumps into ball form, continuously conveying the lumps of dough in a substantially straight line through a controlled proofing atmosphere at such a rate of speed that the lumps of dough merge with one another to form a continuous strip, and then continuously moving the continuous strip in a straight line through a baking atmosphere and progressively baking said strip without disturbing the continuity thereof.

JAMES T. DUFFY, JR.